United States Patent [19]
McConachy

[11] Patent Number: 5,182,458
[45] Date of Patent: Jan. 26, 1993

[54] EFFICIENT HIGH TOWER WIND GENERATING SYSTEM

[76] Inventor: Harry R. McConachy, 2/9 David St Balaclava, Mellbourne, Vic, Australia, 3183

[21] Appl. No.: 850,992

[22] Filed: Mar. 12, 1992

Related U.S. Application Data

[63] Continuation of Ser. No. 735,319, Jul. 24, 1991, Pat. No. 5,146,096, and a continuation-in-part of Ser. No. 542,578, Jun. 25, 1990, Pat. No. 5,062,765.

[51] Int. Cl.$^5$ ................................. F03D 9/00
[52] U.S. Cl. ....................... 290/55; 290/44; 415/4.3; 415/4.5
[58] Field of Search ............... 52/148; 212/176, 179; 290/44, 55

[56] References Cited

U.S. PATENT DOCUMENTS

| | | | |
|---|---|---|---|
| 1,034,760 | 8/1912 | Bräckerbohm | 52/148 |
| 3,053,398 | 9/1962 | Liebherr et al. | 212/176 |
| 3,207,263 | 9/1965 | Cull | 212/179 |
| 4,011,694 | 3/1977 | Langford | 52/148 |
| 4,217,501 | 8/1980 | Allison | 290/55 |

OTHER PUBLICATIONS

National Asso. Broadcasters Engineering Handbook, George Bartlett, editor, 1975, pp. 154-156.

Primary Examiner—A. D. Pellinen
Assistant Examiner—Robert Lloyd Hoover
Attorney, Agent, or Firm—Laurence R. Brown

[57] ABSTRACT

A more efficient wind power generation system is afforded by extending tower heights to several hundred meters to operate wind catching rotors and generators aligned with the wind direction at various levels along the tower. With multiple vertically cascaded wind generators and higher velocity winds at higher elevations greater power is produced as a system characterized by a small footprint. This is particularly enhanced by a single mast construction, which is supported by a dynamic guy wire tensioning system to accommodate varying lateral forces primarily caused by the change in direction of wind loads on the tower. The mast is built from modular sections connected together at articulated joints, between which the various rotors are stationed. Thus, the accumulated torques and lateral stresses in the tower are minimized and do not accumulate along the length of the tower thereby to lengthen life expectation and reduce the chances for catastrophic failure in the presence of the higher velocity winds encountered. Also maintenance at such heights necessary where movable parts are present, is enhanced by an internal lift in the mast structure and an uppermost work platform with a rotatable lifting crane.

10 Claims, 7 Drawing Sheets

EFFICIENT HIGH TOWER WIND GENERATING SYSTEM

This is a continuation-in-part of co-pending application Ser. No. 07/542,578, filed June 25, 1990 now U.S. Pat. No. 5,062,765 and a continuation of application Ser. No. 07/735,319 filed Jul. 24, 1991 now U.S. Pat. No. 5146,096.

TECHNICAL FIELD

This invention relates to wind generating systems and more particularly it relates to the construction of tall towers of a height of several hundred meters, extended into higher velocity wind regions for more efficient generation of power and tower features making such tall towers feasible.

BACKGROUND ART

Wind generator systems with associated tower structure are well known in the art. The status of such prior art is exemplified by a brief discussion of the following U.S. Patents.

Various types of wind responsive generators are known. For example, in 4,792,700; Dec. 20, 1988 issued to J. L. Ammons, a wind actuated rotor is disposed at the top of a single mast tower supported by guy wires. Such systems are inefficient both as to use of ground space and as to the utility of the available wind. Particularly at spots where prevailing winds exist, fields of such units may be disposed, and separate towers for each rotor limit the number of generators in such fields, increase the land costs and the tower costs per rotor. In this system, the use of a single mast tower is desirable to keep the footprint small and to keep tower costs down. However, this system is only operable at relatively modest heights of the rotor and cannot support a rotor at such heights that higher velocity winds are available, as unaffected by the shear friction with the ground at lower levels.

It has been known to cascade vertically on a single tower structure several rotors. This is advantageous in producing a smaller footprint per rotor, and in more effectively using available wind. However, it introduces much greater stresses up the tower, which are difficult to deal with, particularly with a single mast type of tower. Consider that the rotors to be effective must catch and resist the wind, thereby providing great lateral forces at up-tower locations. Since wind tower generation systems must be able to withstand high velocity gusting winds, the towers therefore need to be rugged and costly. In particular, consider the problems with a single mast type of tower, wherein lateral bending stresses in steel bracing tends to fatigue the metal. Thus, very costly and heavy tower structure is necessary to rigidly brace a tower against wind loads, and in general such systems could not be made to practically operate in the presence of higher velocity winds available at greater tower heights, particularly with the added stresses and lateral forces of wind encountering the multiple cascaded rotor generator systems spaced along the height of the tower. For example, W. D. Gillette in U.S. Pat. No. 4,087,990, May 9, 1978, departs from a single mast type tower to accommodate cascaded rotor structures. Similarly, R. Crehore in U.S. Pat. No. 4,184,084, Jan. 15, 1980, uses a multiple masted pyramid arrangement. Nevertheless, neither system could be made practically operable at significant heights and require large footprints, thus increasing costs and decreasing generating field efficiency.

As taught in U.S. Pat. No. 4,217,501; Aug. 12, 1980 by W. D. Allison, increased efficiency may be achieved by aligning rotors with the wind direction. That desirable feature is offset therein however by the low heights and necessity to use multiple supporting towers for disposal of several rotors.

A desirable feature of U.S. Pat. No. 4,134,707; Jan. 16, 1979, M. H. Ewers, is the ability to mount cascaded rotors in modular units at various tower heights. However this wind generation system is incapable of operation at any significant height above the ground, and because of a common vertical drive shaft and associated bearings has no ability to flex in the presence of high wind loads. Thus tower construction must be very rigid and expensive.

Another desirable prior art feature is outlined in U.S. Pat. No. 4,011,694; Mar. 15, 1977, F E. Langford, namely a dynamic guy wire system for balancing the lateral forces on a tower. This system is for protection of individual guy wires to prevent overloading, and thus permits smaller guy wires to be used or protects from sudden wind gusts, etc. that exceed the capacity of the individual guy wires. However, in this system a large number of guy wires is necessary to distribute the entire load, and there is no provision for the tower to flex or bend in the presence of peak loads.

While radio tower prior art exists, it cannot be deemed equivalent structure because in essence there has not been any problem in dealing with the lateral forces exerted at various tower heights by wind interaction with rotor-generator units.

In the F. G. F. Bräkerbohm U.S. Pat. No. 1,034,760; Aug. 6, 1912, an articulated radio tower construction uses ball bearings resting on glass plates between each of a series of vertical mast sections individually guyed to the ground. The articulation feature is desirable in the manner later shown. However, the unequivalent differences between radio antenna masts and the very tall and highly transversely loaded electric generator towers of this invention require many different kinds of problems to be resolved. Thus, entirely new and functionally different articulation means are provided by this invention.

As described in *Civil Engineering*, July 1959, pp. 35-37 in the article, "Baltimore's Candelabra" by Robert S. Rowe, a tall antenna tower of about 200 meters is known in the antenna arts. However, this art could not teach those in the wind generating arts how to make an operable tower of greater heights that will bear the lateral wind forces reacting upon a plurality of rotor generators located at various heights along the tower. Nor is it feasible to construct towers as described therein, because of the necessity for workers to do so much detailed craftsmanship in assembling tower elements at great heights above the ground. Thus, no tall towers of the prior art are known which can achieve the wind power generator objectives of the present invention.

A further problem not adequately addressed in the prior art is that of maintenance of a wind powered generator system. Because of movable rotors, scheduled maintenance, such as for lubrication etc. is required in addition to maintenance required by catastrophic failure of any part of the system. Towers, and in particular single mast small footprint towers are not generally adapted to efficient and effective maintenance. The time of repair is critical also to the continuous generation of power, which should be interrupted as little as possible. This maintenance problem is amplified with greater tower heights. Consider for example, the necessity to replace rotor structure or generator structure at heights of several hundred meters above the ground. This requires special handling equipment such as cranes, which are not conventionally available for operating at such heights, and which if provided would be extremely costly.

Accordingly, it is a general object of the invention to improve the state of the wind generating art by resolving the foregoing deficiencies of the prior art and producing a more powerful and efficient generation system with small footprint adaptable to use in wind generating fields at prime locations with limited space, such as in mountain passes, and the like. Other objects, features, and advantages of the invention will be found throughout the following description, claims and accompanying drawings.

DISCLOSURE OF THE INVENTION

This invention thus provides a wind generating system arranged with a vertically oriented single mast tower carrying a plurality of vertically cascaded rotors for wind powered generators high into the atmosphere to avoid lower wind speeds affected by ground friction shear. The tower has a series of connected modular mast sections each supporting a resident rotor. Joints between the modular sections are provided with articulation means consistent with requirements for a wind power generating system on the mast, thereby permitting some tilt and individual section position adjustment in response to lateral forces due primarily to wind gusts encountering large area movable rotor surfaces not found on antenna masts. These joints are combined in articulated movement to permit a limited degree of relative angular tilt between two adjacent modular mast sections. Thus, accumulated stresses from many sections of a very tall tower are isolated to reduce fatigue and chances for catastrophic failure. More important, it is feasible thereby to make tall wind generator towers economically that do not require excessively heavy bracing.

An accompanying guy wire system is guyed to a disc fastened to the top of each mast section immediately below the flexible coupling supporting the tower in its vertical posture. A tensioning system permits each guy wire to respond dynamically to loading from wind gusts, which in combination with the articulated joint structure provides a stable vertical single mast tower that will support a plurality of cascaded wind rotors and accompanying generator means along a tower height, which typically exceeds two hundred meters and may exceed 500 meters.

For power generation efficiencies, the cascaded rotors provide a large generating capacity with a small footprint area about the single mast tower. For maximizing the effective use of available wind, the rotors are directionally oriented individually with wind direction differences along the tower height which occur when the tower and rotor structure extends far enough off the ground to reach higher velocity winds. Further efficiency is effected by making possible a high tower wind generating system to us wind speeds not slowed down by the shear friction forces of the ground and its impediments such as trees, buildings, or even adjacent windmill fields.

The power generation system has features for facilitating maintenance, necessary with rotary machinery and in the event of catastrophic failure of tower mounted equipment such as rotors or accompanying generator equipment. Thus, a service platform at the top of the tower with a crane facilitates handling and replacement of rotor assemblies for example, and a lift operable within the hollow single mast with articulated mast sections permits repair personnel attention to lubrication and other maintenance activities at any position on the tower.

Other features and details will follow throughout the remaining specification, drawings and claims.

BRIEF DESCRIPTION OF THE DRAWINGS

Like reference characters relate to similar features throughout the several views of the drawings, in which.

THE PREFERRED EMBODIMENT

Figure 1:
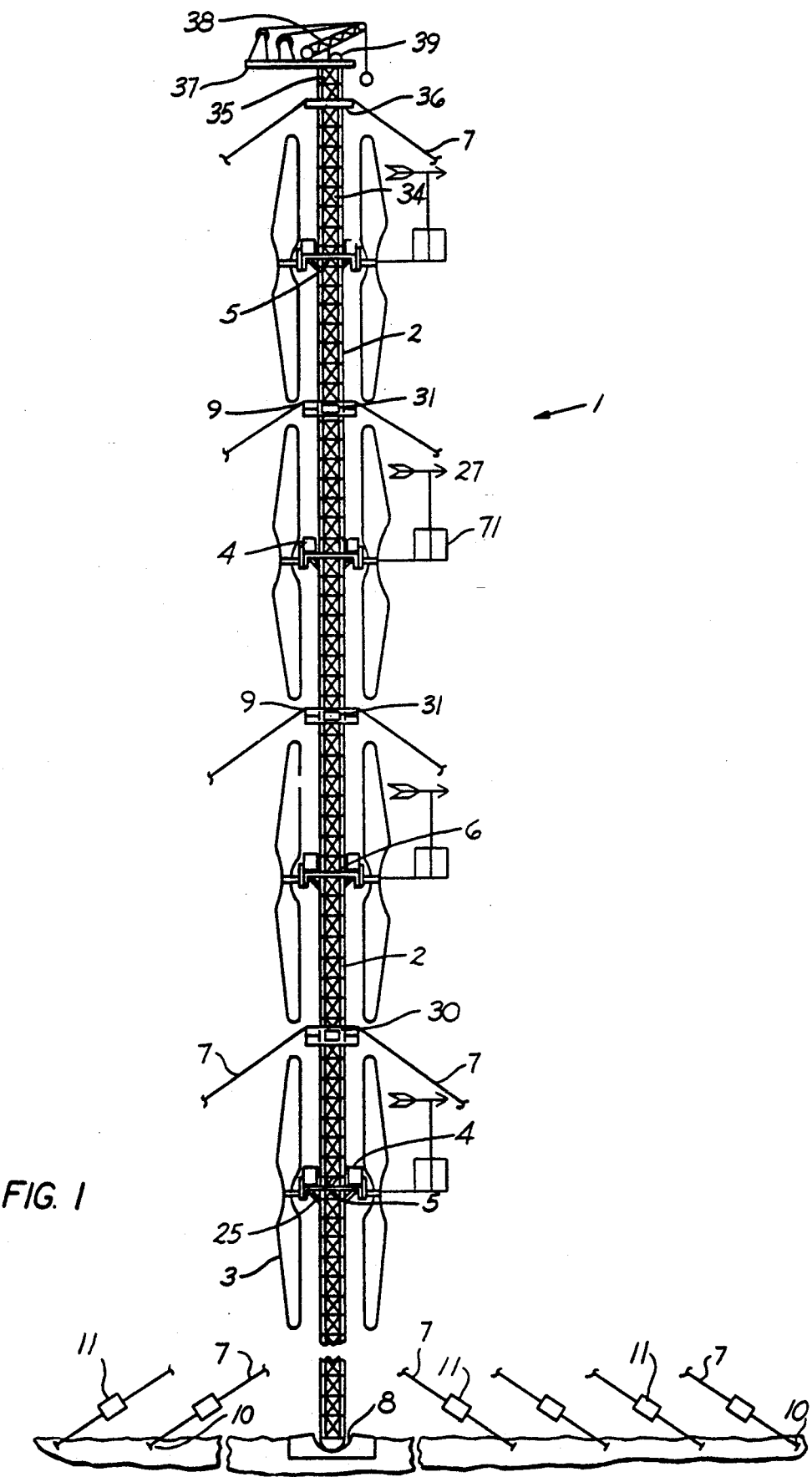
FIG. 1 is a side view sketch, partly foreshortened, of a tower with accompanying wind power generation features, as afforded by a preferred embodiment of the invention.

FIG. 1 shows the single mast of the tower and accompanying wind powered generator system afforded by this invention. The tower has a series of modular mast sections 2 coupled together at articulated joints 9, hereinafter discussed in more detail. At least the uppermost mast sections 2 support wind catching rotors or propellers 3 arranged on a base 5 and platform 6 suitably supported by tower bracing and support structure 25 in substantially mid-section position so that rotors 3 will not interfere with guy wires 7 coupled to the intervening joints 9 between adjacent sections. Rotary electric power conversion units or generators 4 are preferably coupled to each separate rotor set at its site on the tower for wiring into a power system (not shown) in a conventional manner.

Typically four (or more) guy wires 7 are connected about the tower at the several vertical elevations between the joints 9 and corresponding ground support structure 10. Intervening turnbuckles 11 are serially interspersed in the guy wires for adjustment of tension and length in a manner to be later discussed.

The tower is mounted by suitable base support structure containing some means such as mating concave and convex steel plate bearing structure 8 on the tower and ground respectively that permits the lowermost tower section to move or deviate a small amount from vertical as required in response to lateral dynamic wind induced forces and adjustments in the tension in the lowermost set of guy wires. Note that the guy wires 7 are angled to prevent interference with rotors 3, which may be vertically cascaded closely together along the entire height of the tower, with the exception that the initial ground contact mast section 45 or other section may be devoid of rotors. The length of modular mast sections do not necessarily need to be nearly that of rotors 3 and may support more than one rotor assembly.

At each joint 9, articulation means 31 is interposed to similarly permit adjoining tower sections to be relatively moved and adjusted over a small and confined degree of vertical misalignment in response to lateral forces imposed on the tower structure.

The mast frame is substantially square and hollow along its entire length to accommodate a lift shaft 34 for transporting maintenance workers and materials. The lift cage 35 by means of winch 39 provides access to the rotatable maintenance platform 37 at the top of the shaft. It carries the jib crane 38 so that machinery may be raised and lowered to desired positions along the mast. The wind vanes 27, are preferably located at different mast heights to determine the direction of the wind and aid in the orientation of the rotors 3 in alignment with the wind direction. Other instruments such as wind velocity sensors and inclination sensors to show the angle of departure of any mast section from vertical are also placed at appropriate positions along the mast for use in controlling the power generation system and the tower guy wire support system.

Figure 2:
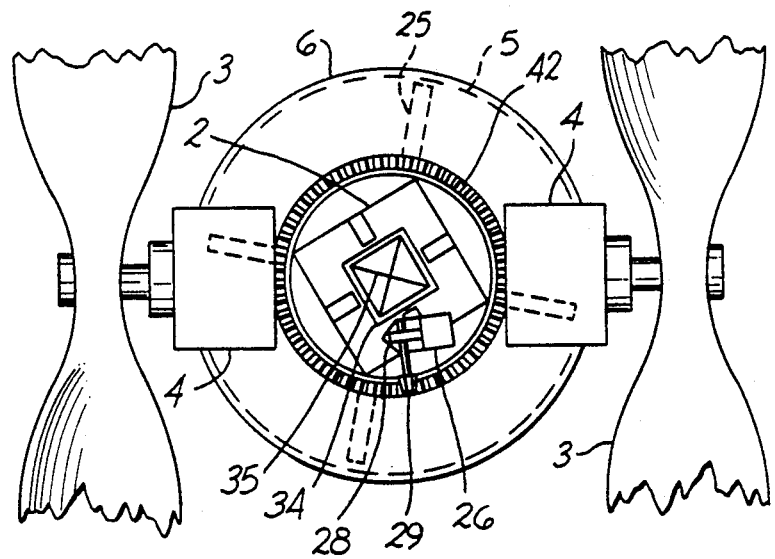
FIG. 2 is a fragmental top view, into the tower axis, of a mechanism for positioning wind catching rotors in alignment with wind direction.

FIG. 2 shows in more detail the rotor mount stations positioned substantially midway in the tower mast sections 2. The rotor generator units 4 are coupled to the two rotors 3 on diametrically opposite sides of the mast. One rotor is contra-rotary to the other, so that the power output from the rotor on the leeward side of the mast is not greatly lessened by the deflection of the air stream by the rotor on the windward side. The pairs of rotor-generator sets are rotatable to find the wind direction and mounted on platforms 6 supported by base 5 and brackets 25 about the tower section 2 bracing, with internal lift cage 35 shown in the hollow interior lift shaft 34 centrally oriented within the tower section 2 framework.

The ring gear 42 positions the rotor-generator assemblies about the mast as driven by pinion gear 29 by means of reversible electric motor 26 with suitable reduction gearing 28 such as a worm gear. The ring gear 42 and rotor-generator assemblies 3, 4 may all be affixed to the platform 6 for rotation on base 5. The rotors are thus faced directly into the air stream by a mechanism, later described in more detail, for responding to a weather vane (27) to keep the rotors dynamically in position to efficiently use the available wind power as it dynamically shifts in direction.

Figure 3:
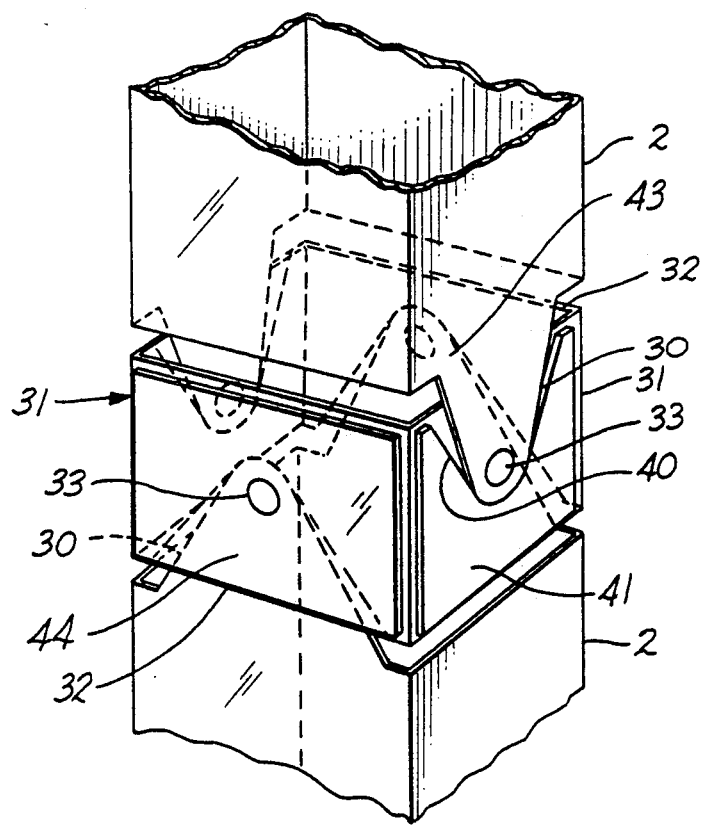
FIG. 3 is a perspective side view sketch of a preferred embodiment of an articulated joint between adjoining mast section modules afforded by the invention.

In FIG. 3, the articulated coupling joint between the two adjacent mast sections 2L and 2T is shown. Pairs of yokes 43, 44 having tapered and rounded end structure 30 at the ends of the mast sections 2 are positioned on different faces of the square mast profile perpendicular to each other, to fit within the steel plate faces 32 of the connecting joint assembly 31. These faces 32 are welded to both the inside and outside of the bearing plates 41 which receive and journal the yoke ends 30. Thus the yokes may pivotably move a small and confined amount limited by the angled stops 40 of the bearing plate structure. The entire block 31 coupling joint is thus a universal coupling joint permitting a confined degree of relative angular movement between the two adjacent mast sections 2. The yokes may be locked in place in the assembly by the bolts 33 passed through the respective yokes at the pivot axis and secured by lock nuts on the opposite sides of the respective facing plates 32.

Figure 4:
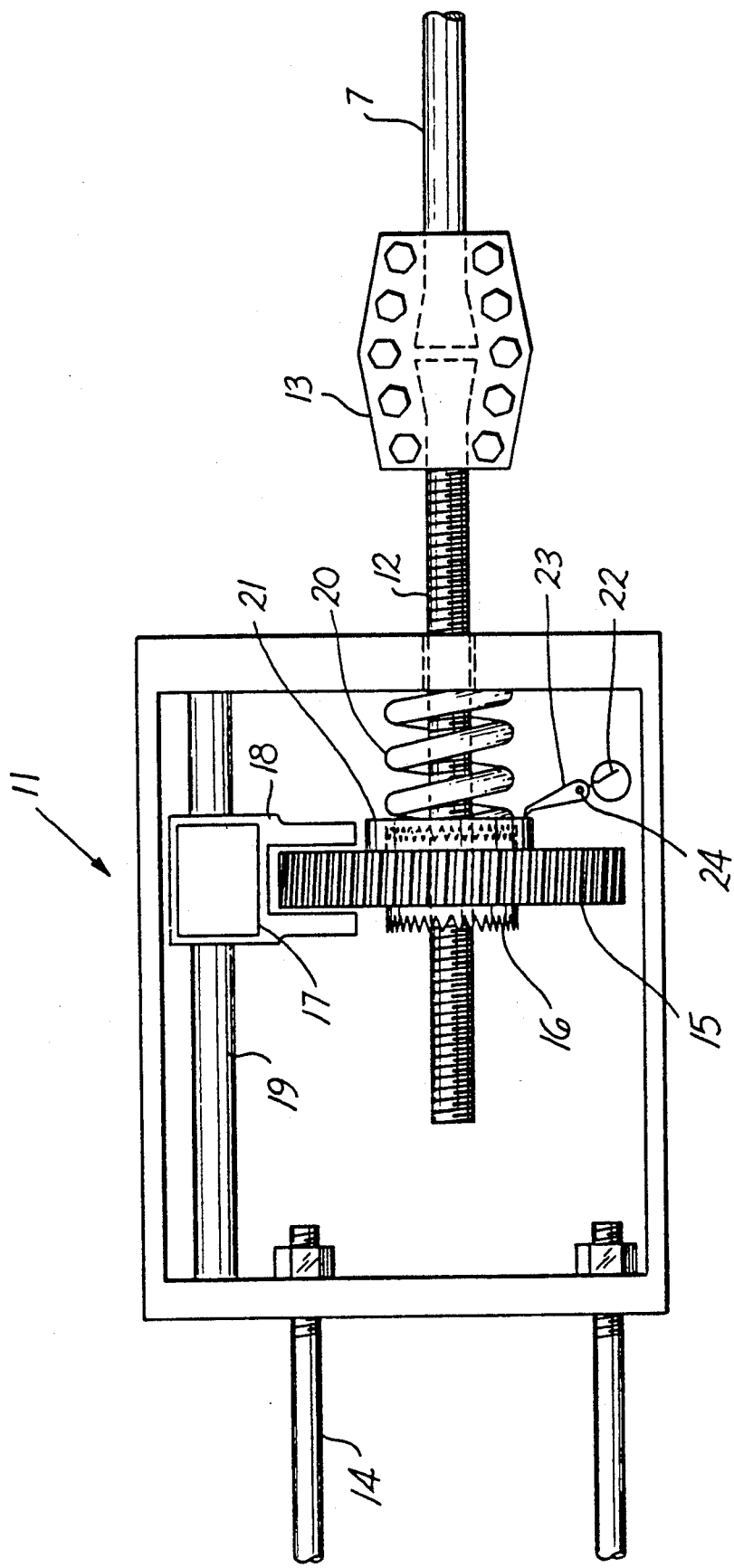
FIG. 4 is a fragmental sketch of a motorized turnbuckle arrangement for adjusting tension in guy wires in accordance with this invention.

A motorized turnbuckle arrangement 11 is shown in FIG. 4 for adjusting tension in the individual guy wires 7. The guy wires are preferably pre-stressed high tensile wire anchored at positions on the mast substantially midway between the arcs defined by adjacent rotor 3 tips (FIG. 1) (or slightly above to compensate for the angle toward the ground). At least four guys 7 are attached to one of the adjoined mast sections 2 at every articulated joint position 9 along the shaft.

The tensioning turnbuckle means 11 is inserted serially in the individual guy wires 7, such as by means of coupler clamp 13 affixed to threaded bolt 12 supported in and coupled by the intermediate turnbuckle arrangement 11 to two anchor rods 14, which may be part of the ground anchor means 10 (FIG. 1).

A worm wheel 15 threaded at its axial center on bolt 12, is turned by reversible electric motor 17 and an intermediate worm drive gear 16. The forked base plate 18 carrying the motor 17 slides along rod 19 and straddles the worm wheel 15 to ensure correct alignment. The worm wheel 15 thus can adjust the length of the guy assembly when desirable. The tension in the guy is determined by one or more strong helical or semi-elliptic springs 20 seated on a ball or roller thrust race 21 as interposed between the worm wheel 15 and the end of the gear box.

The gauge 22, by means of lever 23 pivoted about axle 24, senses the actual tension in the guy wire 7 by contact for example with the face of the thrust race 21. This tension can be used as a parameter for an automatic tension and length control system for the guy wires. There may also be means for adjusting the tension of spring 20 (not shown) in response to a servo system coupled to gauge 22.

Figure 5:
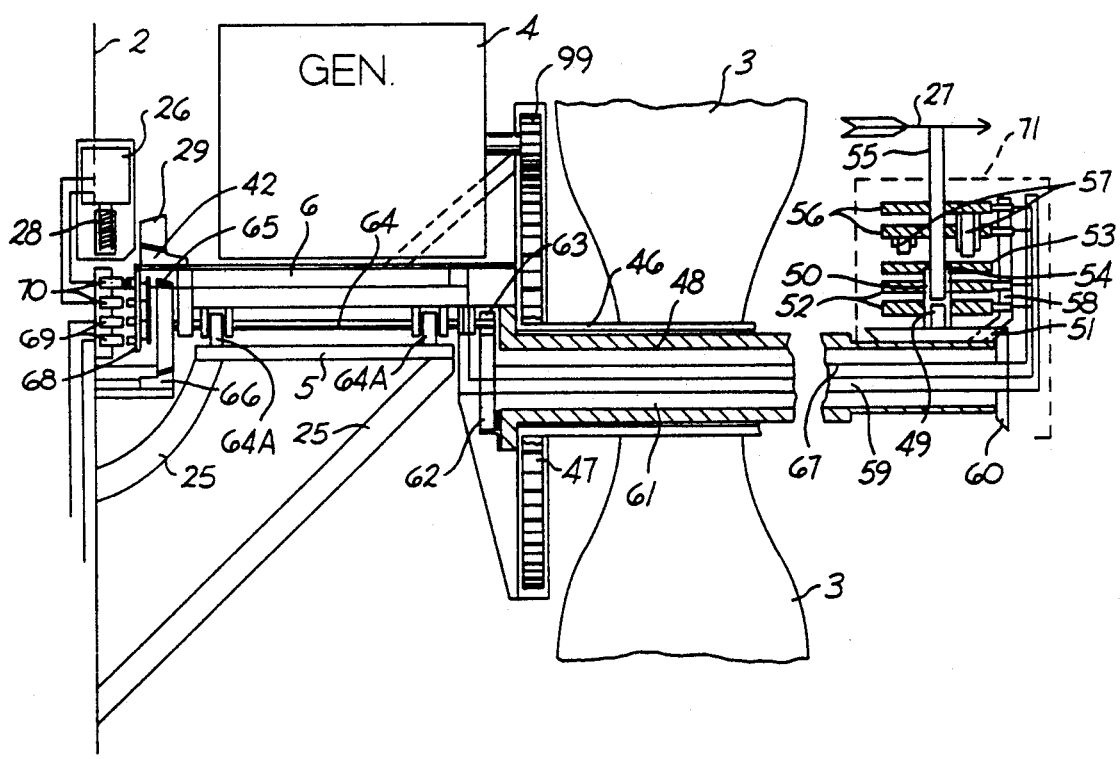
FIG. 5 is a side view sketch, partly cut away and partly in section, of a mechanism for aligning each rotor-generator installation with the prevailing wind direction.

In FIG. 5, the mechanism for aligning the rotors 3 to face the prevailing wind is shown, in the manner generally sketched on FIG. 1 by corresponding arrows 27 and blocks 71. The arrow 27 thus represents a weather vane that aligns with the wind. Thus in a dynamic, swirling or unsettled wind pattern, where the prevailing wind force is not in the same direction for the different rotors 3 at different heights on the tower, adjustments are made to keep each rotor 3 aligned for better generating efficiency.

In operation, the shaft of generator 4 is driven by the small gear wheel by way of the rotor 3 driven drive gear 47, which is affixed on sleeve 46 along with the rotor 3. The sleeve is journalled for rotation about supporting hollow steel axle 48, which is tapered at its outer end and has a strong flange at the inner end, which in turn is bolted to a supporting fitting extending below the generator mounting platform 6. Affixed near the outer axle 48 end is the spindle stub 49 about which a sleeve 50, extending upwardly from the end of the spindle stub 49, rotates along with bevel gear 51.

Two slip rings 52, insulated by adjacent discs are disposed under the commutator segments 53 on diametrically opposed sides separated by insulating strip 54. The commutator disc and slip rings turn with sleeve 50 and are insulated therefrom. The slip rings 52 are electrically connected respectively to the commutator segments 53. The spindle 55 of weather vane 27 is rotatably nested in spindle 50, and carries slip rings 56 insulated from the spindle 55. The spring loaded brushes 57 extending from the slip rings 56 contact the commutator segments 53 or intermediate insulating strips 54 between them. Four horizontal spring loaded brushes on insulator bracket 58 affixed to the end of axle 48 to carry the output from slip rings 52, 56 by four wire cable to actuate the rotor alignment mechanism.

Rotatable sleeve 61 inside axle 48 carries pinion gear 60 meshing with bevel gear 51 at its outer end and spur gear wheel 62 at its inner end. Shaft 64 is rotatably carried by the bracket under platform 6. Rollers 64A, rotatably held by spindles in brackets welded underside platform 6 contact and roll on the surface of support platform 5 as the wind direction changes and thus carry the weight of platform 6. On the inner end of shaft 64 is affixed gear wheel 65, which meshes with ring gear 66 encircling the mast and bolted to mast frame 2 and brackets 25.

The four wire conductor from slip rings 52, 56 passes through tube 67 inside sleeve 61 and on the underside of platform 6 to connect with slip rings disposed vertically on a circular bracket 68 surrounding the mast and attached to frame 6 for contact with brushes 69, 70 vertically disposed on an insulating bracket affixed to the mast for conveying power by brushes 69 to the reversible motor 26. Motor 26 via bevel gear 29 and ring gear 42 is aligned with the wind direction.

When the wind is steady, the two brushes 57 rest on the insulating strip 54 of the commutator disc. However, when the weather vane 27 brings brushes 57 over the conductor segments 53, the motor 26 is energized to turn the platform 6 in the direction indicated by the weather vane 27. The movement of platform 6 through gear train 65-66, 63-62, 60-51 turns the commutator disc through the same degree of rotation and in the same direction as the motor 26 turns the platform 6 to bring the the insulating strip 54 under the two brushes 57 and disconnecting the motor from the power source until another wind change occurs. Wind changes in the opposite direction serve to reverse the commutator segments 53 and change the direction of rotation of motor 26. The housing 71 protects the elements from the weather.

Figure 6:
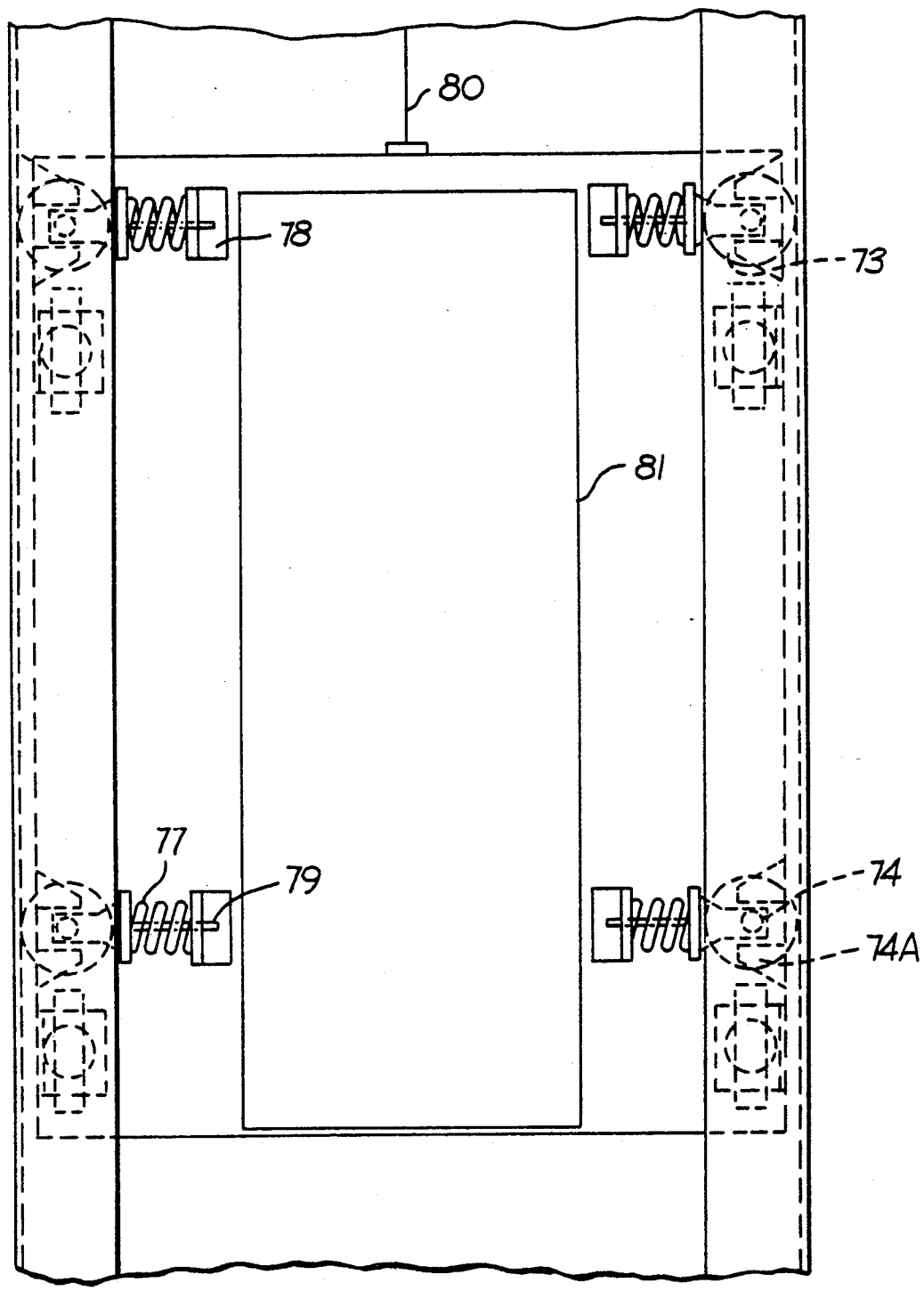
FIG. 6 is a side view sketch of the lift cage assembly showing wheels riding on tower supported tracks.
Figure 8:
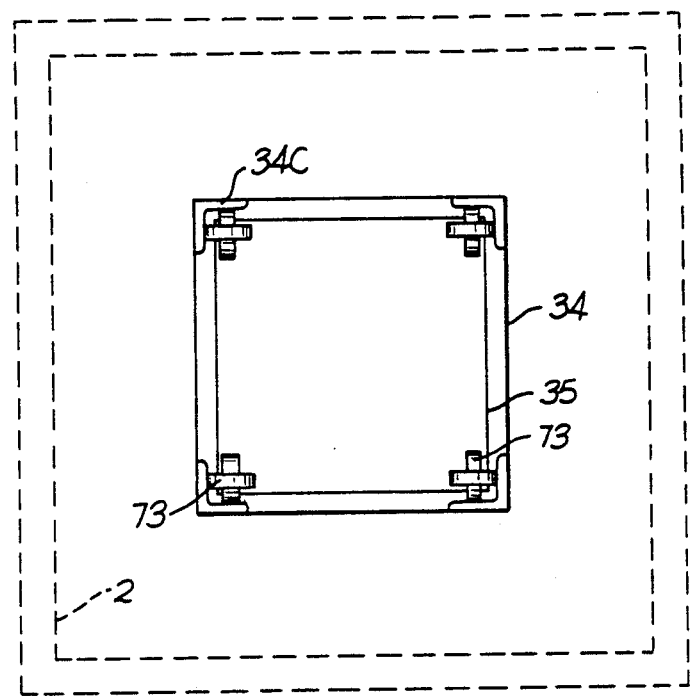
FIG. 8 is a top view sketch, partly in phantom of the lift cage assembly wheels engaging the lift shaft disposal within the vertically disposed mast sections.
Figure 7:
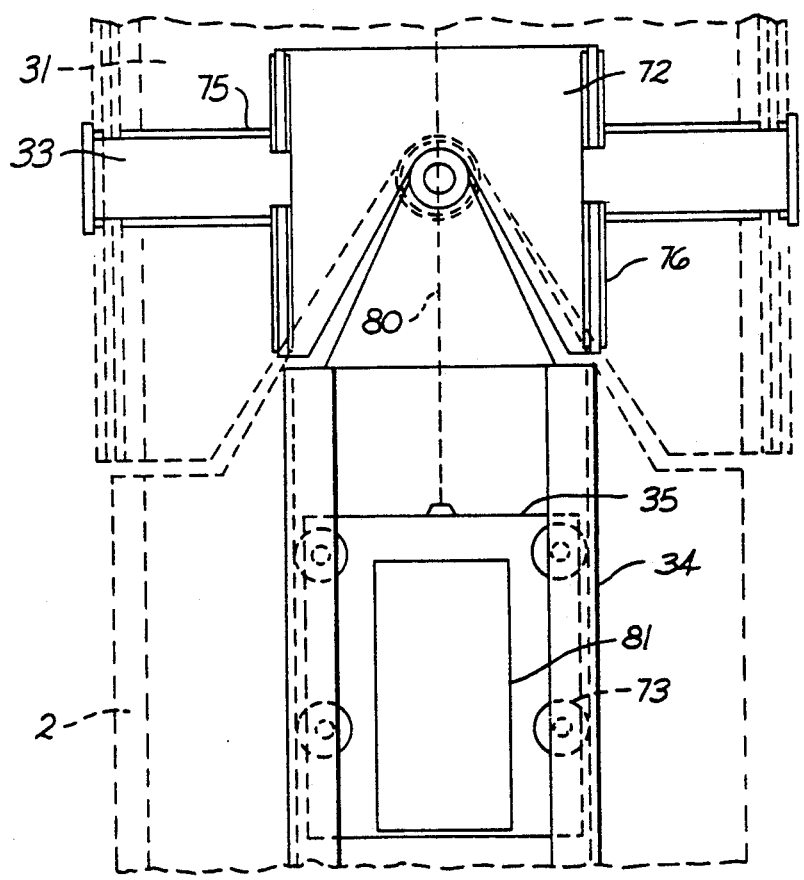
FIG. 7 is a side view sketch, partly in phantom showing the lift cage assembly, path through an articulation joint provided by this invention.

FIGS. 6, 7 and 8 show the manner in which lift cage 35, suspended by cable 80, passes through the articulated joints 72 (9, FIG. 1) on mast 2 between adjacent mast sections with the help of spring loaded rollers 73.

Lift shaft sections 34 are of the same length as the mast sections 2, and the same pivot pins 33 are common to both. Spacer sleeves 75 placed on the pivot pin between reinforcing plates 32 (FIG. 3) of the mast coupling and similar plates 76 of the lift shaft coupling keep the lift shaft centered exactly within the mast sections.

The four corners 34C of the lift shaft section 34 are made of angle iron which serve as rails for the spring loaded rollers 73 at opposite ends of the lift cage 35, which protrude through slots in the lift cage walls for keeping the lift cage walls always clear of the lift shaft walls. The ends of the forked frames 74 which carry the rollers 73, slide in guides 74A attached to the lift cage walls to keep the rollers properly aligned. Helical springs 77 exerting pressure on the roller frames 74, are anchored at their inner ends to angle iron brackets 78 bolted to the lift cage walls. Metal rods 79, sliding through holes in the brackets 78 and springs 77, are screwed into tapped holes in the middle of the roller frames 74 to further stabilize the roller assemblies. The lift cage doorway 81 is in the middle of one of the lift cage 35 walls.

In FIG. 7, the lift cage 35 is approaching the lift shaft coupling 72 located centrally inside the mast coupling 31, with the rollers 73 being of sufficient diameter to smoothly accommodate any irregularities that might occur where the ends of the lift shaft meet the coupling at the coupling joints.

Figure 9:
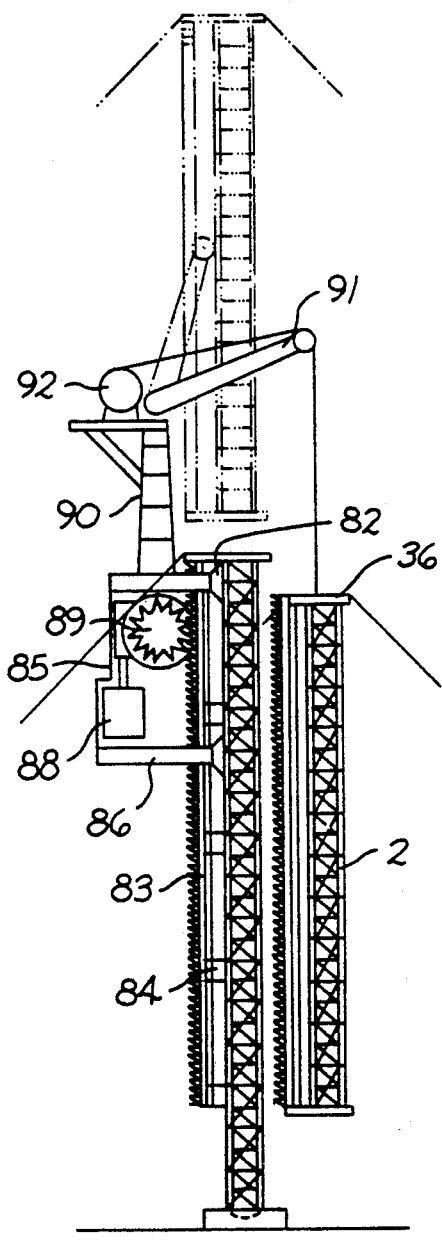
FIG. 9 is a side view sketch, partly in phantom, illustrating the placement of mast tower sections, primarily assembled on the ground, in place atop existing tower structure.

FIG. 9 shows the method of erecting the upper mast sections after the ground supported section is in place. Each section of the mast 2 is assembled on the ground including the inner lift cage sections 34 and guy wires connected to platforms 36. The last installed section, which is the ground contact section in FIG. 9, is securely guyed in place. The toothed rack 83 is also assembled on the ground before raising section 2 in place by the crane 92. Brackets 84 extend the toothed rack 83 outward enough so that the rack clears the fittings at the top of each mast section to which the guy wires are attached.

Figure 10:
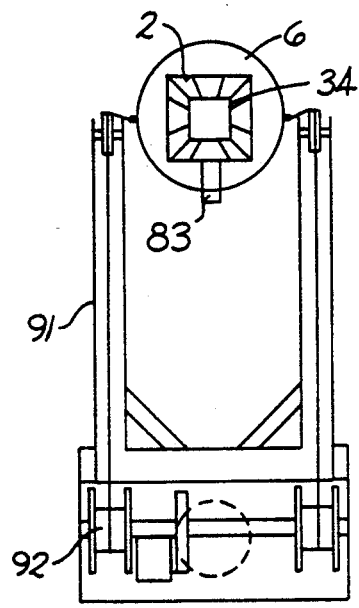
FIG. 10 is a top view sketch of a twin jib crane vertically hoisting a new mast section for positioning atop the tower mast.
Figure 11:
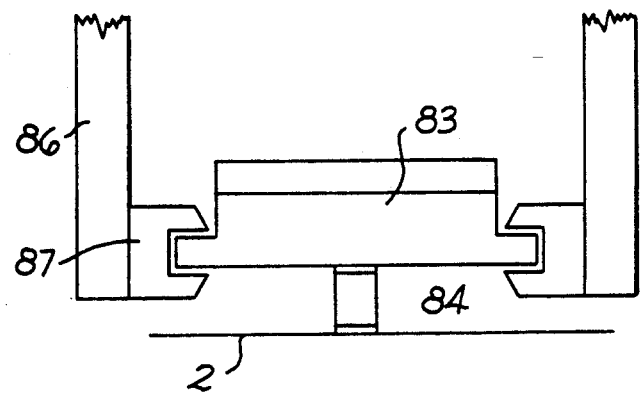
FIG. 11 is a detailed fragmented sketch of a track along which a carrying carriage vertically moves.

As also shown in FIG. 10, the crane 92 by means of twin jibs 91 is mounted on a long vertical extension 90 to the frame of a carriage 85, which traverses the rack 83 teeth by means of a toothed pinion 89 driven through suitable gearing by reversible electric motor 88. The Carriage channel iron bar end members 86, perpendicular to the mast 2, extend inwardly to the clips 87 of FIG. 11 to grip and slide along the base of the rack 83 holding the carriage parallel to the mast 2 and vertically mobile.

Before the mast section 2 is lifted into position, the carriage 85 is traversed, as shown in FIG. 9 to the top of the mast sections already in place, where four reinforcing brackets are used to bolt the carriage in place to the channel bars 86 on one side of the mast. This assures that the load being lifted is supported by the mast frame and does not overload the rack and pinion.

Then the mast section 2 is lifted in place by attachment from jibs 91 of the cable to each side of the section at a position slightly above the midheight of that section so that it remains vertical during the lift. The section 2, as shown in phantom, thus is aligned vertically with the lower mast section(s) in place to align the coupling members and insert the pivot bolts (33, FIG. 7) in place. The guy wires are than made fast to in place anchors (10, FIG. 1).

Now brackets 82 may be removed from both the mast and the channel irons 86 on the carriage, for traverse to the top of the latest positioned section of the mast to accommodate the same procedure for installing another mast section 2. After all the mast sections are in place and secured, the crane 92 is used to lift and position the lift cage winch, and later to lift and position the mast top crane 38 (FIG. 1) on its rotatable platform 37. Then the crane 92 and carriage may be dismantled and lowered to ground by the mast top crane 38 for use in erection of other such masts. The fixed bases 5, rotatable platforms 6, rotors 3, generators 4 and ancillary gear are all then lifted into place by the mast top crane 38.

It is therefore evident that this invention advances the state of the art with an efficient and operationally feasible wind powered generator system for more effectively using available wind power in small footprint installations.

Accordingly those novel features indicative of the spirit and nature of the invention are set forth with particularity in the following claims.

I claim:

1. A high altitude electric power generating system comprising in combination, a single column tower of significant height divided into a plurality of mast sections articulated at joints between the sections of the mast along its height, said mast being constructed to bear significant vertical and lateral weight loads contributed by said generating system distributed along the height of the mast, a plurality of vertically disposed rotor driven electric generators mounted on different ones of said articulated mast sections at different mast heights, and means comprising guy wire means coupled in the vicinity of the joints to tensioning means for maintaining the tower vertically while dynamically tilting individual ones of said articulated mast sections independently over a narrow angle from vertical in response to lateral wind induced forces on said rotor driven generators.

2. The system of claim 1 further comprising mast sections and articulation joints constructed of a hollow internal passageway, and lift means vertically movable in said passageway to pass through the articulation joints.

3. For a high altitude electric power generating tower system for disposing a vertical array of rotor driven generators, the improvement comprising a single column tower having at least one mast section in place supported by guy wires with a platform on top ready for receiving a further mast section, a toothed rack mounted one side of each mast section, a vertically movable carriage supporting a crane vertically movably supported on said toothed rack of a mast section in place in a position above the top platform of the highest previously located mast section to pick up and transport it vertically in a position substantially parallel to the mast section in place a further mast section for affixing to the platform atop the previously located section, wherein said crane further comprises twin jibs extending on opposite sides of said tower and winch means for engaging said further mast section on the ground on diametrically opposite sides to lift the further mast section and set it on the platform atop the previously positioned and guyed mast section.

4. A high altitude wind generating system with wind powered electric generators comprising in combination:
   a vertically oriented generator support single mast tower having a series of interconnected modular mast sections along a vertical height connected by joints, said tower carrying a plurality of wind powered generators with accompanying rotors positioned at a multiplicity of vertical levels between the joints of said interconnected modular mast sections,
   a guy wire system for supporting the tower against lateral forces at a multiplicity of vertical levels from positions on the tower between the rotors,
   guy wire tensioning means comprising a worm gear mechanism coupled in the guy wires for dynamically adjusting guy wire tension in response to wind forces at the respective vertical levels to maintain the tower vertical, and
   articulation means connected to define said joints between adjoining modular mast sections permitting the individual mast sections to be relatively angularly moved a few degrees from vertical in response to lateral forces on the tower.

5. The system of claim 4 wherein the articulation means comprise universal joint structure.

6. The system of claim 5 wherein the universal joint structure comprises means for holding the adjacent mast sections in vertical directional alignment with each other.

7. The system of claim 4 further comprising a maintenance platform supported by the tower at a position above the wind generators with a rotatably positionable crane for use in servicing the wind generators.

8. The system of claim 4 wherein each of the rotors located at the different vertical levels include an accompanying mechanism for orienting the rotors in alignment with wind direction for maximizing energy efficiency.

9. The system defined in claim 4 wherein the mast sections define a hollow mast frame with a square and hollow lift shaft passageway through substantially the length of the tower and its articulation joints, and a lift cage and winch for moving the lift cage vertically along the tower within the passageway and through the articulation joints for maintenance purposes.

10. The system of claim 4 wherein the tower comprises a network of bracing members arranged on four sides of a substantially square cross section configuration.

* * * * *